Figure 1:
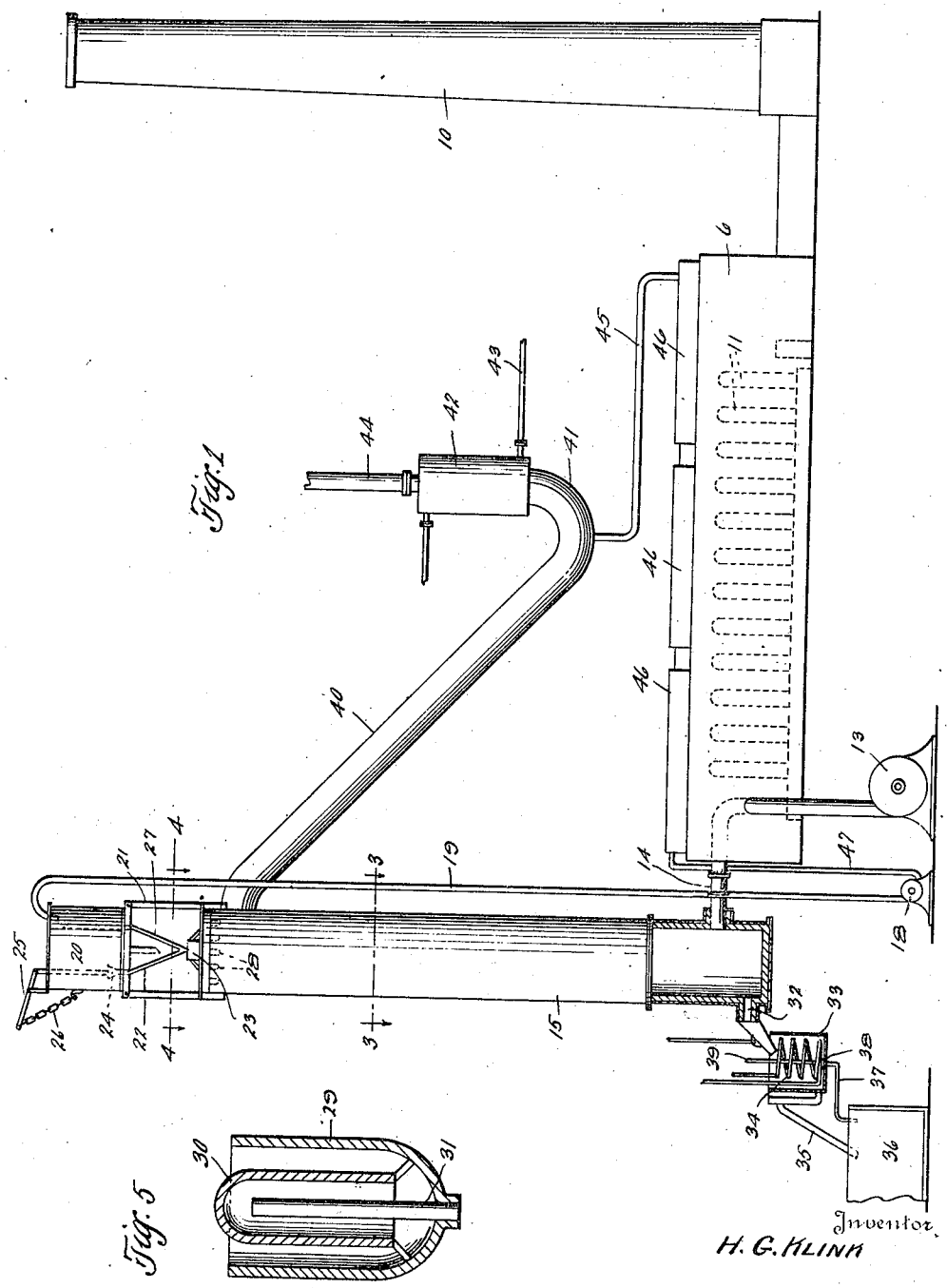

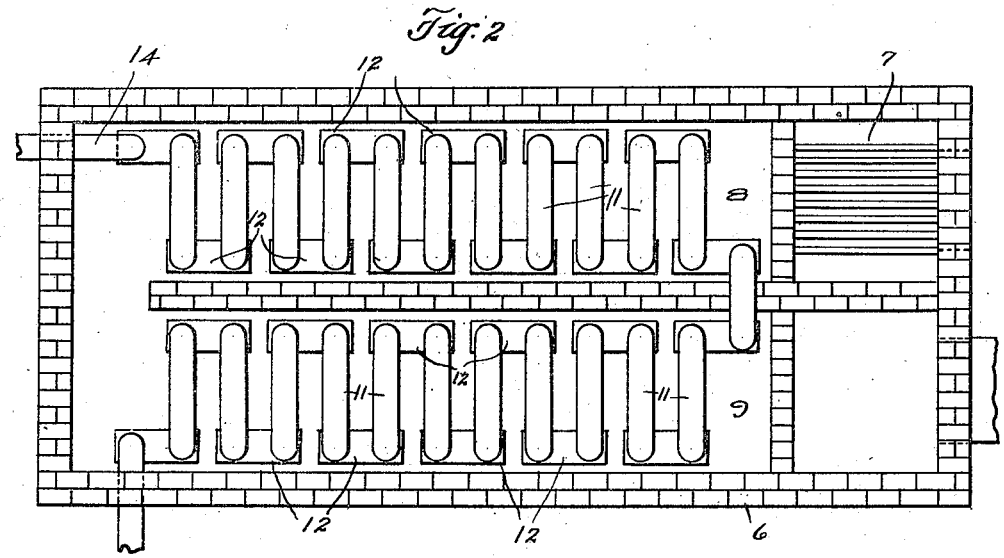
Fig. 2
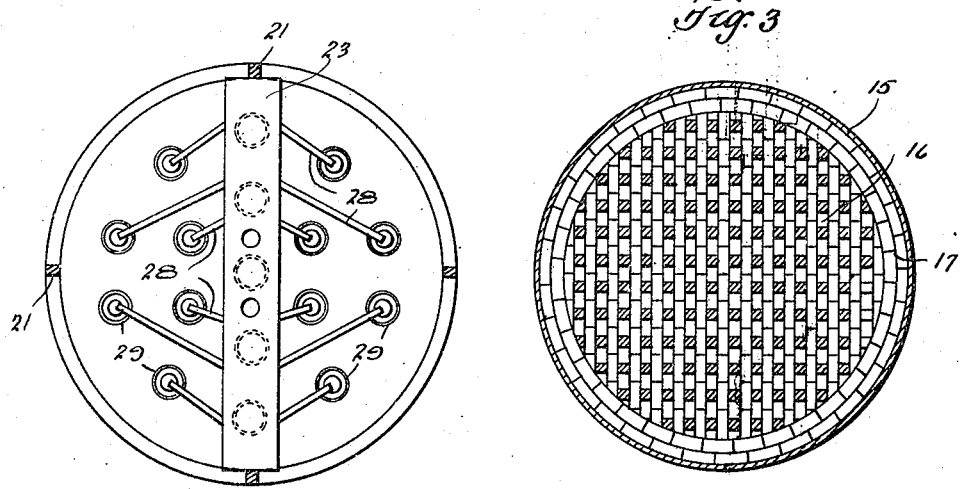
Fig. 4
Fig. 3
Inventor
H. G. KLINK

UNITED STATES PATENT OFFICE.

HENRY G. KLINK, OF MOUNDSVILLE, WEST VIRGINIA.

PROCESS OF AND APPARATUS FOR CONCENTRATING SULFURIC ACID.

1,276,377. Specification of Letters Patent. Patented Aug. 20, 1918.

Application filed March 23, 1917. Serial No. 156,912.

*To all whom it may concern:*

Be it known that I, HENRY G. KLINK, a citizen of the United States, residing at Moundsville, in the county of Marshall and State of West Virginia, have invented certain new and useful Improvements in Processes of and Apparatus for Concentrating Sulfuric Acid, of which the following is a specification.

This invention relates to a method of and apparatus for concentrating sulfuric acid, and it embodies the idea of forcing heated air through the weak acid as the latter drips or flows through checker brick work or other acid-proof material confined in a tower, the weak acid being fed into the top of the tower and the heated air being forced up from the bottom, the concentrated acid being drawn off from the bottom of the tower, and the vapor passing out of the top of the tower to a condenser which recovers the weak acid which may then be passed through evaporating pans and returned to the tower again.

The benefit of the process is that the acid is concentrated by hot clean air, and is not subjected to products of combustion or the like, which discolor the acid and deposit impurities therein.

The apparatus contains improvements in its details with respect to structure, and the use of the waste heat of the air heating furnace for evaporating the weak acid before it is delivered to the tower.

The invention is illustrated in the accompanying drawings, in which Figure 1 is a side elevation, somewhat in diagram, of the apparatus. Fig. 2 is a plan of the air heating furnace with its cover removed. Fig. 3 is a section of the tower on the line 3—3 of Fig. 1. Fig. 4 is a plan looking down on the line 4—4 of Fig. 1. Fig. 5 is a detail of one of the sealed feeding cups at the top of the tower.

Referring specifically to the drawings, 6 indicates a furnace in which the products of combustion flow from a grate 7 forth and back through chambers 8 and 9 to a stack 10. Within the chambers of the furnace are a plurality of inverted U-bends or pipes 11, connected in series by boxes 12, forming a continuous air conduit from a blower 13 to an outlet pipe 14 which communicates with the base of the concentrating tower 15. For most of its length this tower is filled with checker brick work indicated at 16, and with a brick lining 17. This checker work may be brick, tile, stone or other acid-proof material, with spaces by which the weak acid can flow down through the tower and the air blast up through the same.

The weak acid is fed to the top of the tower by a pump 18 through a pipe 19 which delivers into a tank 20 mounted on supports 21 at the top of the tower. From this tank a feed pipe 22 leads to a distributing box 23, the feed being regulated by a valve 24 which by the lever 25 and chain 26 can be opened to the desired extent. 27 is an overflow pipe from the tank to the distributing box.

From this box a plurality of spouts or pipes 28 lead to feed cups set in the closed top of the tower, the cups being scattered to deliver the acid at various places in the tower.

The cups are sealing cups, to prevent escape of fumes at the top of the tower, and one of them is shown in section in Fig. 5. It comprises an outer cup 29, an inner inverted cup 30, and a pipe 31, so that the flow from the spouts 28 is into the cup 29, forming a liquid seal, the liquid overflowing through the cup 30 into the pipe 31 from which it falls on to the checker work below.

At the base of the tower is an outlet 32 to a cooling box 33 containing a coil 34 through which water may be flowed, the concentrated and cooled acid overflowing through a pipe 35 into a receiving tank 36. 37 is a flush pipe from the bottom of the box controlled by a valve 38 at the lower end of a rod 39.

From the upper end of the tower a pipe 40 leads off, and by a bend 41 communicates with a condenser 42 through which water is flowed by a pipe 43. 44 is a vent pipe at the top of the condenser. From the low point of the bend 41 a pipe 45 leads to the first of a series of evaporating pans 46 which are connected finally by a pipe 47 to the acid pump 18.

In the performance of the process and the use of the apparatus, weak acid is pumped through the pipe 19 to the tank at the top of the tower, from which it is fed through the distributing box and the feed cups into the tower 15, and it drips over or through the checker work therein. By means of the furnace the air is heated in the air conduits 11 and is forced into the bottom of the tower and up through the checker work. In its passage it evaporates the water of the weak acid, and the concentrated acid is delivered at the bottom through the cooler to the receiving tank. The gas and fumes pass out the top of the tower through the pipe 40, and the weak acid condensed therein, and in the condenser 42 collects in the bend 41 and flows into the series of evaporating pans which are placed on top of the furnace and so utilize the heat thereof. This weak acid is returned to the pump and passed again through the tower. Additional weak acid may from time to time be supplied to the evaporating pans. The drawing shows a single system, but the apparatus may be duplicated or the towers arranged in series for the repeated treatments to effect the desired degree of concentration. The parts which are subjected to the action of the acid will of course be made of lead or other material which will resist the action of the acid, or lined with brick or other acid resisting material, and various changes may be made in the form or arrangements of the parts within the scope of the invention.

I claim:

1. The method of concentrating acid comprising flowing weak acid in one direction through an intersticed mass, and forcing a blast of heated air through said mass in the opposite direction, and cooling the gas after its passage through said mass and returning the condensate through said mass.

2. In a concentrating apparatus, the combination of an evaporating tower having an inlet for liquid at the top and an outlet for liquid at the bottom, a furnace, an air blast conduit heated by said furnace and discharging into the base of the tower, a condenser communicating with the upper end of the tower, to receive gas therefrom, and means to return the condensate to the liquid inlet at the top of the tower.

3. In a concentrating apparatus, the combination of an evaporating tower having an inlet for liquid at the top and an outlet for liquid at the bottom, a furnace, an air blast conduit heated by said furnace and discharging into the base of the tower, a condenser communicating with the upper end of the tower, to receive gas therefrom, and means to return the condensate to the liquid inlet at the top of the tower, said means including evaporating pans through which said condensate flows, said pans being exposed to the heat of the furnace.

In testimony whereof I affix my signature in presence of two witnesses.

HENRY G. KLINK.

Witnesses:
FRANK J. ECKENFELS,
HUGH W. THOMPSON.